United States Patent [19]

Morris

[11] Patent Number: 4,627,569
[45] Date of Patent: Dec. 9, 1986

[54] FOUR FUNCTION PNEUMATIC CONTROLLER

[75] Inventor: John C. Morris, Castro Valley, Calif.
[73] Assignee: Staefa Control System Inc., San Diego, Calif.
[21] Appl. No.: 743,163
[22] Filed: Jun. 10, 1985
[51] Int. Cl.⁴ ............................................. F24F 7/00
[52] U.S. Cl. ...................................... 236/49; 137/85; 236/80 B
[58] Field of Search ..................... 236/49, 80 R, 80 B; 137/468, 85

[56] References Cited

U.S. PATENT DOCUMENTS

| | | | |
|---|---|---|---|
| 2,634,747 | 4/1953 | Markson | 137/85 X |
| 3,806,027 | 4/1974 | Ginn et al. | 236/49 |
| 3,934,795 | 1/1976 | Ginn et al. | 236/80 B X |
| 3,941,310 | 3/1976 | Travaglio et al. | 236/49 |
| 3,994,434 | 11/1976 | Boyer et al. | 236/49 |
| 4,077,567 | 3/1978 | Ginn et al. | 236/49 |
| 4,291,832 | 9/1981 | Ginn et al. | 236/49 |

Primary Examiner—William E. Wayner
Attorney, Agent, or Firm—Donald C. Feix; T. M. Freiburger

[57] ABSTRACT

A pneumatic controller for use in controlling airflow in a conditioned air distribution system is adjustable to accommodate different types of damper actuation and thermostats in different systems. The four-function controller can be manually reconfigured to be a direct acting/direct reset controller, a reverse acting/reverse reset controller, a direct action/reverse reset controller or a reverse acting/directing resent controller, all using a single diaphragm valve responsive to differential pressure between total air and static air inputs. A reset unit on one end of the controller can be mounted in four different positions, two upright and two inverted, to provide the four functions, with total air and static air inputs being reversed in position when the controller is in a reverse acting mode. A differential pressure responsive valve at the heart of the system is controlled by a spring which can act as either a tension spring, for direct acting, or as a compression spring, for reverse acting. Manual adjustments are provided for adjusting the spring pressure in the absence of reset, and for adjusting the degree of change in spring pressure when reset occurs. These two adjustments control minimum pressure differential threshold and maximum pressure differential threshold. The latter adjustment preferably includes a slidable fulcrum movement for shifting the position of a fulcrum about which a reset arm pivots during reset, to control the spring tension displacement during reset from zero, at one extreme, to a maximum displacement at the other extreme.

18 Claims, 9 Drawing Figures

DA/DR

DA/RR

RA/RR

RA/DR

FOUR FUNCTION PNEUMATIC CONTROLLER

BACKGROUND OF THE INVENTION

The invention relates to controls for conditioned air distribution systems, and in particular relates to a pneumatic controller having versatility for four different modes of operation to accommodate differing system operating parameters and components.

A great variety of controls, including pneumatic controls, have been disclosed and used previous to the present invention. For example, see U.S. Pat. Nos. 3,806,027; 3,934,795; 4,077,567; and 4,291,832, all assigned to the assignee of the present invention. These patents disclose systems and controllers involving various differing parameters in different conditioned air distribution systems, and the disclosures of these patents are hereby incorporated by reference into this application. Typical parameters which may vary in such systems are:

(1) whether the system is cooling or heating;
(2) whether a spring-biased damper or flow valve in a duct of the system is normally open or normally closed (which determines whether the controller must be direct acting or reverse acting, respectively, as those terms are understood herein);
(3) whether a thermostat connected to a controller is direct acting or reverse acting and
(4) whether the controller is in a direct reset mode or a reverse reset mode, which is related to the type of thermostat used.

The above-listed U.S. Pat. No. 4,077,567 discloses and illustrates a pneumatic temperature reset differential pressure controller which functions in a general sense in the manner of the present invention. That velocity controller, for a variable air volume control system, was connectable to sensors for static air and total air in a duct, for sensing air flow velocity, and was reset by changes in the room air temperature as determined by a thermostat in the room. The controller included a means for full time on-line control of the air flow velocity in the variable air volume system, not simply acting as a maximum velocity limiter.

In the subject prior controller the room temperature signal from the thermostat was interlocked with a bias spring in a differential pressure controlled valve, to reset a velocity set point with changes in the room thermostat signal so that, for example, if the room became too hot, the differential pressure threshold (velocity threshold) at which a normally open duct damper would begin to be closed would be increased, tending to increase or to maintain at a maximum the cooling air flowing into the room.

In such a controller the interlock between the room temperature signal and the velocity set point or threshold enables the velocity controller to maintain a constantly regulated flow of air into a room in proportion to the room thermostat's demands and independently of variations of static pressure in the duct, since the sensors always measure pressure differential between the flowing air and static pressure. Such a velocity controller is a full time controller, not simply a maximum flow limiter or high limit controller, and the amount of air flow through the duct is controlled from near-zero flow to maximum flow (as set on the controller) in response to the signal from the thermostat. As in U.S. Pat. No. 4,077,567, such a system may include an adjustable minimum flow velocity mechanism for maintaining a regulated minimum amount of air into the room (provided the system source is delivering such a minimum velocity of air through the particular duct), regardless of whether the room thermostat is calling for any air.

In such systems the velocity pressure is generally sensed across a sensing diaphragm which is exposed to the total pressure (including the duct air velocity) on one side and to the static duct pressure on the other side, so that the difference in pressures across the sensing diaphragm corresponds to the air velocity only.

The above-referenced U.S. Pat. No. 4,077,567 has operated as an effective full time velocity controller, but it was designed to be limited to a specific situation, being solely a direct acting, direct reset controller. In other words, the controller was for use with a normally open damper actuator, and normally did not admit compressed air to a damper actuator line. Only when differential pressure between total air and static air exceeded a preset value did the diaphragm valve of the patented system shift to pressure to the actuator line to thereby inhibit air velocity in the duct by tending to close the normally open damper. The controller was for use in a cooling system with a direct acting thermostat, wherein higher temperature would cause pressurized air to flow through an outlet line from the thermostat to the reset portion of the controller, or in a heating system with a reverse acting thermostat.

In general, prior pneumatic controllers have not had the versatility of the present invention, for adjustment and reconfiguration to four different modes of operation depending on the particular system in which the controller is used and the damper and thermostat types employed in the system.

A pneumatic controller manufactured by Kreuter Mfg. Co. and marketed by Environment Elements Corp. under the trademark TITUS, one model of which is Model No. ESV 3010, has been capable of functioning in four different modes. However, that controller had a number of internal differential pressure actuated diaphragm valves, and instead of the versatility and easy reconfiguration of the present invention, the TITUS system depended upon repositioning and interchanging of input tubes among a number of different ports, and a complex system of air passages and a complex system of valves for switching among the passages to activate different modes of operation. In addition, the described controller had many internal smaller-than-pinhole-sized orifices for the flow of air, and the controller required a constant flow of air through it. Such orifices are easily clogged by small particles in moving air.

It is therefore an important object of the present invention to provide a pneumatic controller which controls velocity flow of air in a variable air volume distribution system in response to preset limits and in response to a thermostat as in U.S. Pat. No. 4,077,567, and also which has versatility for use in different systems with different operating parameters and components.

SUMMARY OF THE INVENTION

The controller of the present invention is a full time controller, as in the aforesaid previous patent, controlling the amount of air flow through a duct from near-zero flow to maximum flow in response to the signal from a thermostat and in response to preset flow velocity limits set on the controller.

A primary feature of the invention, in combination with the features just mentioned, is the versatility of the controller as a four-function controller adaptable to a number of combinations of parameters in heating and cooling systems including the type of damper actuation, whether the system is heating or cooling, and the type of thermostat used (direct acting or reverse acting). The controller will operate in any of four modes: direct acting/direct reset, direct acting/reverse reset, reverse acting/direct reset, and reverse acting/reverse reset.

Another important feature of the invention is the simplicity of construction of the controller to achieve both the control functions and the versatility as a four-function controller. The controller is efficient in construction and in ease of adaptation to different applications or modes. The controller has only two input ports dedicated to total air and static air, and only the two tubes leading to these ports need be switched in position when going from direct acting to reverse acting or vice versa. The controller relies only on pressure and not on flow, both air pressure plenums being dead-ended. The position of a reset unit on one end of the controller is changable to any of four positions for the four modes, via two screws which hold the reset unit on the housing of the controller.

The controller of the invention is fully adjustable, with manual adjustments for minimum flow and maximum flow, and with an adjustment for the sensitivity of the reset unit, to be set in accordance with the pressure of compressed air prevailing in the system.

In accordance with one embodiment of the invention, a pneumatic controller for use in controlling air flow in a distribution system for supplying conditioned air to a room includes a housing with input ports for total air, static air, and main air supply for connection to conduits leading to a velocity probe and a static air monitor in a duct of the system, and to a supply of compressed air. The housing also includes an actuator output port for connnection to a conduit leading to an actuator or motor operating an air flow damper in the duct, for control of the actuator by the controller.

A differential pressure responsive valve means in the housing receives total air and static air inputs and adjusts a flow of compressed air between the main air supply input port and the actuator output port in response to the magnitude of pressure differential between the total air and the static air. The valve means comprise a single differential pressure responsive valve with only two inlets, one for static air and one for total air, as contrasted with prior four-function controllers with a multiplicity of ports and diaphragm valves among which the total air and static air lines must be interchanged for different controller functions. A spring biases the valve means against the influence of the pressure differential.

Connected at one side of the housing is a reset unit with a reset input port for connection to a conduit leading to a thermostat in the room, which adjusts a flow of compressed supply air in response to changes in the temperature in the room relative to a set point temperature on the thermostat. The reset unit includes air pressure responsive shifting means for controlling the position of a spring-biased movable shifter in response to input of compressed air at the reset input port.

There are included reset means for adjusting the pressure of the spring means to thereby adjust the level of pressure differential required to move the differential pressure responsive valve means against the spring means, in response to movement of the shifter in the reset unit.

A primary feature of the controller in accordance with the present invention is a system variation accommodation means whereby the controller may be reconfigured as a direct acting/direct reset controller, a reverse acting/reverse reset conroller, a direct acting/reverse reset controller, or a reverse acting/direct reset controller to accommodate different types of actuation and thermostats in different systems, utilizing a single differential pressure responsive valve means.

The system variation accommodation means preferably includes spring reversing means for changing the spring means between functioning as a tension spring and as a compression spring, so that for a given movement of the reset shifter the spring reversing means varies the effect of reset, between increasing and decreasing the pressure of the spring means and therefore between increasing and decreasing the threshold level of pressure differential required, to thereby enable change of the controller's mode between direct reset and reverse reset. The change of the spring from tension to compression also changes the controller from direct acting to reverse acting.

The spring means may comprise a coil spring and the spring reversing means preferably comprises a spring holder at one end of the coil spring, and means for changing the position of the spring holder to vary the extension of the spring.

The valve means preferably includes a valve port which may be normally open or normally closed depending upon the direction of the biasing of the spring means. In conjunction therewith, the controller preferably includes the spring reversing means for changing the spring means between functioning as a tension spring and as a compression spring. This enables change between direct acting/direct reset and reverse acting/reverse reset, and between direct acting/reverse reset and reverse acting/direct reset.

In combination with the spring reversing means the controller may include a means enabling reversal of the direction in which the movable shifter of the reset moves in response to compressed air input. Thus, for a given tension/compression spring orientation the controller may be changed between direct acting/direct reset and direct acting/reverse reset and between reverse acting/direct reset and reverse acting/reverse reset.

The means for reversing the action of the reset shifter may comprise a provision for connection of the reset unit to the housing in either a normal or an inverted position, through the use of a pair of retention screws as described above.

Another important feature of the controller of the invention is a pivotal reset arm forming a part of the reset assembly. The reset arm is connected to the spring means to adjust the level of pressure differential required in response to movement of the reset shifter. The invertable reset unit is positioned, in either the upright or the inverted position, to receive one end of the reset arm for controlling the pivotal position of the arm. The reset arm pivots about a fulcrum in response to movement of the shifter, so that adjustment of the spring means controlling the differential pressure threshold occurs in a direction opposite the direction of movement of the reset shifter.

The controller preferably includes a slidable adjustment for manually changing the position of the reset fulcrum, either closer to or farther from the spring means, so that the magnitude of adjustment of the spring means by the reset may be manually adjusted by changing the position of the fulcrum point. Closer positions of the fulcrum to the spring means will effect lesser magnitude of adjustment of the spring means during reset.

Pneumatic controller apparatus and methods incorporating the structure and techniques described above and which are effective to function as described above constitute further, specific objects of the invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 7 shows the internal operating components of a differential pressure responsive valve which controls a flow of compressed air between a main air input and an output to an actuator line, and also the internal components of the reset unit. In FIG. 7 the differential pressure responsive valve is in a direct acting mode of operation.

DESCRIPTION OF A PREFERRED EMBODIMENT

Figure 1:
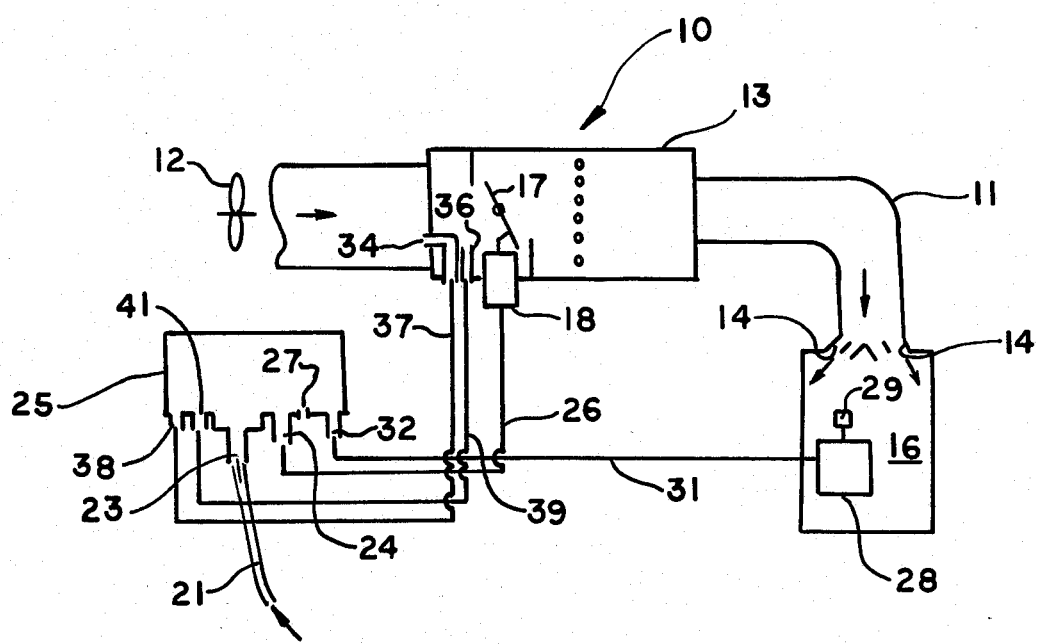
FIG. 1 is a schematic view, which may be in plan or elevation, of a variable air volume conditioned air distribution system incorporating a temperature reset differential pressure controller constructed in accordance with the present invention.
Figure 2:
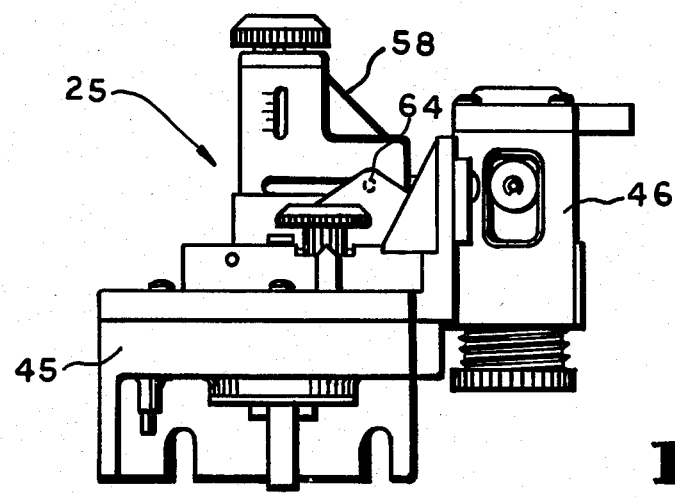
FIG. 2 is a side elevation view showing the controller, including a housing and a removable reset unit, in a normal configuration associated with direct acting-/direct reset mode of operation.

In the drawings, FIG. 1 shows a variable air volume control system 10, including a duct 11, a fan 12, a regulator box in the duct 11, and outlets 14 for conducting air from the duct 11 to a room 16.

In most installations the complete system 10 will include a number of branch ducts 11 with related regulator boxes 13 for supplying conditioned air to different zones of a building, but only a single branch duct and regulator box and related room or zone are shown in FIG. 1 in order to simplify the description of operation.

The volume of air flow through the regulator box 13 is controlled by a valve or damper 17, and the damper 17 is moved in opening and closing directions by an air powered actuator or motor 18.

In the described preferred embodiment of the present invention, as illustrated in FIG. 1, compressed air from an input air line 21 is used to power the damper actuator 18.

A temperature reset differential pressure controller 25 in accordance with the present invention controls the amount of air pressure transmitted from the compressed air inlet line 21, which is connected to a main air input port 23 of the controller, through an outlet actuator line 26 (connected to an actuator output port 24 of the controller) to the actuator 18. This control is achieved by controlled venting of the air pressure from the line 21 through a vent port of the controller systematically indicated at 27 in FIG. 1 and also shown in the sectional views of FIGS. 7 and 8.

The pressure fed to the damper actuator 18 is regulated by the controller 25 in response to air flow velocity in the duct 11 and in response to room air temperature in the room 16, as sensed by a room thermostat 28. The thermostat 28 has an adjustment knob 29 for setting the set point temperature of the thermostat. The thermostat 28 is connected to the differential pressure controller 25 by a pneumatic line 31 in this preferred embodiment, connected to the controller via a reset input port 32. Air flow velocity in the duct 11 may be sensed by a total air pressure pickup probe 34 (e.g. a pitot tube) in the duct, and a static air pressure pickup probe 36 in the duct, as illustrated, or the air flow velocity may be sensed by any other suitable air velocity sensing means.

The sensors 34 and 36 are shown just upstream of the air flow damper 17, but they may alternatively be placed downstream of the damper.

The total air probe 34 is connected to the controller 25 by a pneumatic line 37 connected to a total air input port 38 on the controller, and the static air pressure probe 36 is connected to the controller by a line 39 leading to a static input port 41 on the controller, all as schematically indicated in FIG. 1.

The thermostat 28, in accordance with the present invention, may be either a direct acting thermostat or a reverse acting thermostat. In accordance with conventional understanding, a direct acting thermostat sends out greater pressure when the room temperature is higher, i.e. when the differential between the room temperature and the set point temperature is greater and room temperature is higher than set point temperature. A direct acting thermostat sends a lower-pressure signal or a zero pressure signal through the line 31 when there is a lesser differential between room temperature and set point temperature, or when the differential is zero or when the room is actually cooler than the set point temperature. A reverse acting thermostat, on the other hand, sends a lower pressure signal through the line 31 in response to higher room temperatures, generally acting in reverse as compared to a direct acting thermostat.

The controller 25 is adapted for use in systems, which are either in heating or cooling mode and which use either a directing acting thermostat or a reverse acting thermostat. It is also usable with systems which employ a normally open damper 17 (typically spring-biased toward an open position and throttled toward closure by the action of the damper actuator 18), and in systems which use a normally closed damper 17. In the majority of systems currently in use, the damper is normally open and the thermostat is a direct acting thermostat. If such a system is cooling the room 16, the controller 25 must be in a direct acting, direct reset mode of operation. This means that when air flow velocity (as sensed by pressure sensors 34 and 36) exceeds a threshold velocity the controller will act to close, or move toward closure, a normally open damper 17, thereby throttling the flow of air in the duct 11. The controller is direct acting in the sense that when the velocity threshold (pressure differential threshold) prevailing at the time in the controller is exceeded by the air flow in the duct, the controller acts to admit pressurized air from the compressed air inlet line 21 to the actuator line 26 to act on the actuator 18 to change the prevailing damper position, i.e. to move it toward closure. In this sense of direct acting, the direct acting controller must be matched with a normally open damper 17.

The function of the thermostat 28 and the connecting line 31 is to "reset" the controller 25 to a different pressure differential (velocity) threshold under certain conditions of room temperature as compared to thermostat set point temperature. In the case of a direct acting-/direct reset system which uses a direct acting thermostat and direct acting in the controller 25 as just described, a high temperature differential in a cooling-mode system, with room temperature far above set point temperature, will send a high demand signal to the controller. This is in the form of a maximum pressure delivered by the direct acting thermostat 28 through the line 31, which will cause a maximum degree of reset to occur in the controller 25, increasing the pressure differential threshold in the controller and therefore tending to keep the damper 17 open or to open it further by requiring higher air flow velocity in the duct 11 before any air pressure will be sent through the actuator line 26 to the actuator (to throttle the cooling air flow). In other words, a direct acting thermostat causes reset to occur to raise the pressure differential threshold required to inhibit flow through the damper 17. Thus, when such reset occurs if the direct acting controller is not "acting", and not sending any pressure signal through the actuator line 26 so that the normally open damper is wide open, the reset caused by the thermostat will make any change in this status more difficult and will therefore simply leave the damper 17 at maximum flow. However, if at the time reset occurs the controller 25 is sending some degree of pressure signal to the actuator 18 and throttling the flow of air somewhat at the damper 17, the effect of reset will be to increase the velocity threshold required to maintain such a throttling effect, and therefore to open the damper 17 by removing the air pressure signal 26 going to the damper actuator 18.

System variations include the use of a normally closed damper 17, rather than normally open, which requires a reverse acting mode in the controller 25; the substitution of a reverse acting thermostat 28 for the direct acting thermostat, which would require a reverse reset mode in the controller 25, all other parameters being the same and the system being a cooling system; and changing the nature of the system 10 within which the controller 25 is used from a cooling system to a heating system. This would require a change to reverse reset, if a direct acting thermostat is used, or a change to a reverse acting thermostat, if the controller 25 is in direct reset. The table below shows the relationship among cooling and heating systems and normally open damper (NO) which requires direct acting (DA) and normally closed damper (NC) which requires reverse acting (RA), as relates to the nature of the thermostat—direct acting (DAT) or reverse acting (RAT), and whether the controller is in direct reset mode (DR) or reverse reset mode (RR).

| DAMPER/ACTION | COOLING | HEATING |
|---|---|---|
| NO/DA | DAT, DR | DAT, RR |
|  | RAT, RR | RAT, DR |
| NC/RA | DAT, DR | DAT, RR |
|  | RAT, RR | RAT, DR |

As is well understood by those skilled in the art, the table shows that the action of the thermostat must be matched appropriately to the direction of reset in the controller, with the correspondence being different in heating than in cooling.

FIGS. 2 through 9 show the controller 25 of the invention in greater detail.

The controller 25 comprises a main housing 45 to which is connected a reset unit 46. As indicated in the sectional view of FIG. 7, the main housing includes the pair of input ports 38 and 41 for total air and static air from the duct probes 34 and 36 which, as further explained below, will interchangably receive the total air and static air input conduits, depending upon whether the controller is in a direct acting mode or in a reverse acting mode.

Additonal ports on the controller housing 45 are the main air input port 23, to which is connected the conduit 21 from the main air supply of compressed air for the system, and the actuator output port 24 which conducts compressed air from the main air line 21 through the actuator line 26 to the actuator 18 whenever the controller determines that the actuator line should be pressurized.

Figure 7:
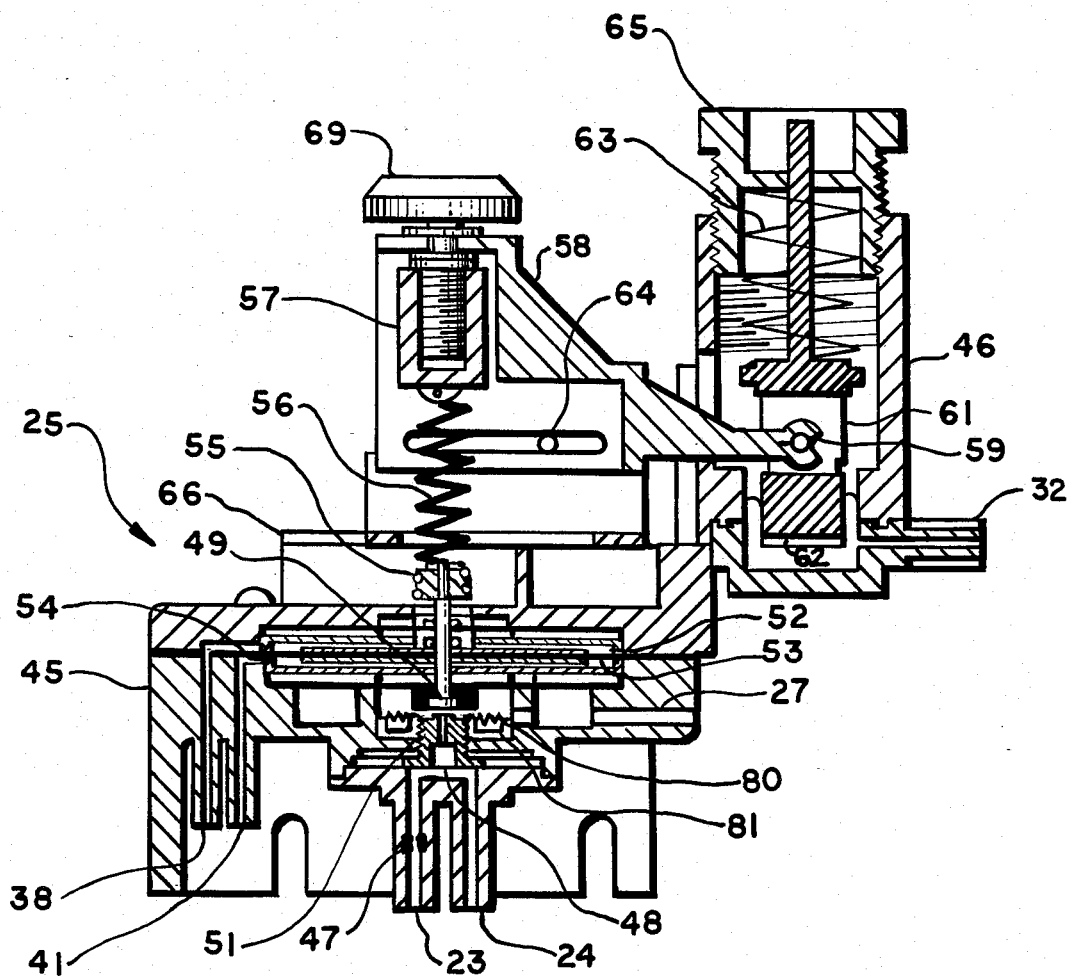
FIG. 7 is a sectional view in elevation through the controller, generally as viewed along the line 7—7 in FIG. 6.

As indicated in FIG. 7, the main air input port 23 includes a restrictive orifice 47, which may be on the order of about 0.005 inch in diameter, so that the compressed air from the main air supply must flow somewhat gradually into a space or plenum 48 leading to the output port 24, rather than rushing through to the output port at high flow rate. This is typical of a well-known form of valve in such a controller, as shown in U.S. Pat. No. 4,077,567. The valve is operated by a venting system controlled by a valve closure member 49 and a valve seat 51. When the member 49 is closed against the seat 51, there is no venting of main air from the space or plenum 48, and compressed air flows to pressurize the actuator line 26. However, when the valve member 49 is pulled away from the valve seat 51, this effects a venting of the compressed air bleeding through the orifice 47 in the main air port, and the result is that compressed from the main air line is vented away to atmosphere before it can pressurize the actuator line.

The valve member 49, which operates to open and close against the venting seat 51, has its position controlled by a diferential pressure responsive system which receives both the total air and the static inputs from the probes 34 and 36 in the duct. Again, this is generally similar to what is shown in U.S. Pat. No. 4,077,567. In a normal direct acting mode of operation, the total air enters a plenum 52 above a diaphragm 53 of the controller, while static air, normally at lower pressure, enters a plenum 54 which is below the diaphragm 53 in the orientation of the controller 25 shown in the figures. As is well known, when the total air pressure exceeds the static air pressure by a preselected amount, it will overcome the force of a spring 56 (which may be called a velocity spring) attached to the movable member 49 and cause the member to move. This movement, in the direct acting mode shown in FIG. 7, is in the direction of closing the vent valve and therefore effecting a flow of main air to pressurize the actuator line 26.

Figure 8:
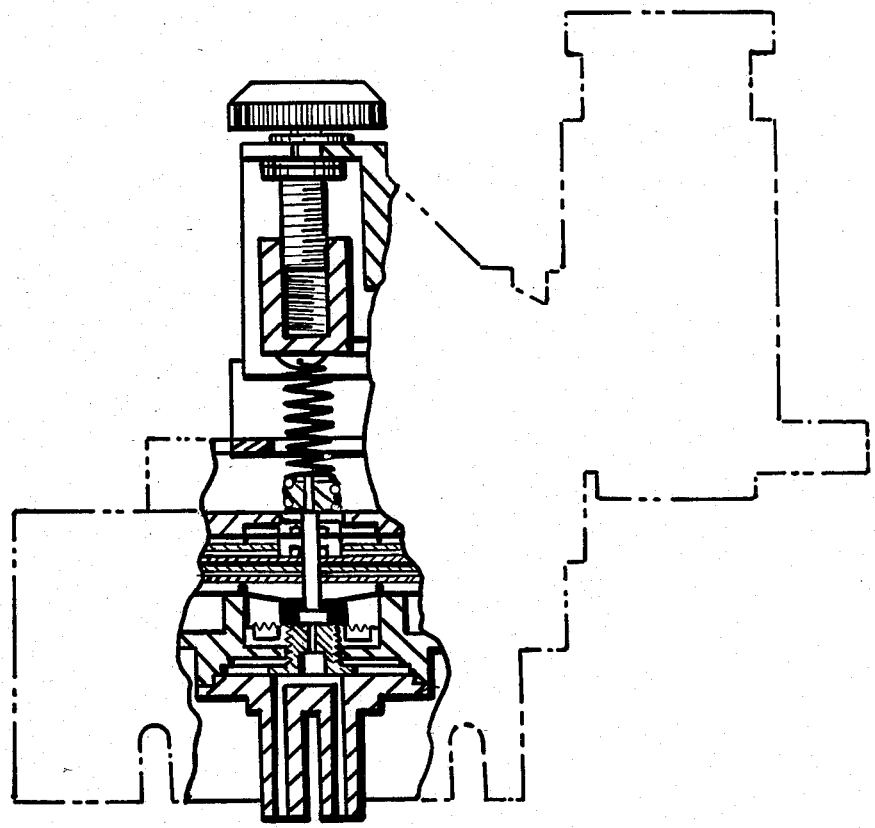
FIG. 8 is a view similar to FIG. 7, but showing the differential pressure responsive valve in a reverse acting mode.
Figure 9:
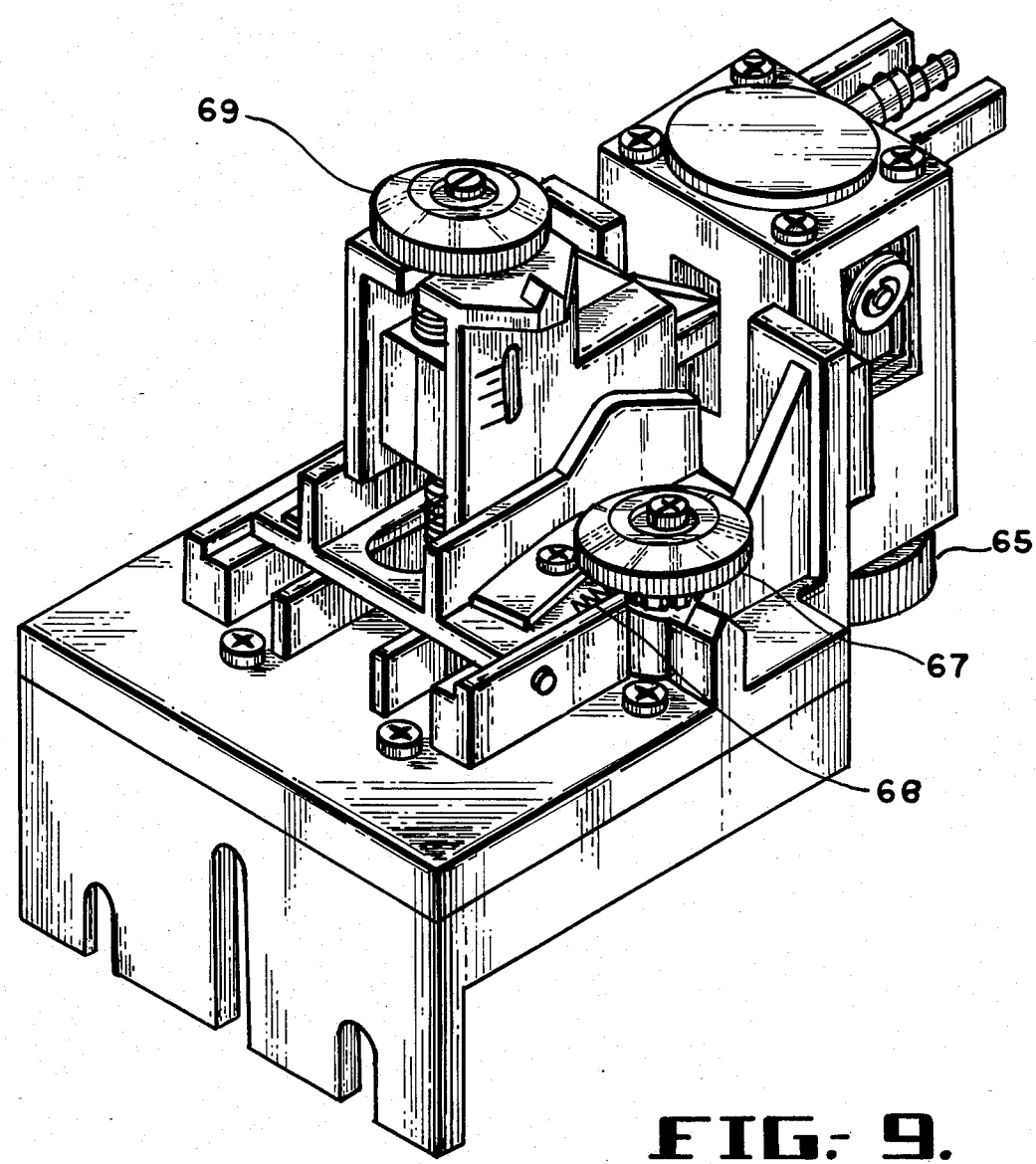
FIG. 9 is a perspective view of the controller of the invention, illustrating the manner in which one differential pressure threshold adjustment functions.

The spring 56 in this preferred embodiment of the invention is a coil spring which is in tension in the direct acting mode shown in FIG. 7, but in compression in the reverse acting mode shown in FIG. 8. The spring 56 is held vertically (for compression) by a spring seat 55 at the top end of the valve member, with the lower end of the spring gripping the spring seat. As can be seen from the drawings, as a tension spring, the spring 56 pulls up (as viewed in the figures) on the movable valve member 49 to hold it away from the venting seat and therefore to prevent pressurization of the actuator line 26 whenever the pressure differential from the two duct probes (and thus the air velocity in the duct) is below a certain value. When the differential pressure overcomes that value, the spring tension is overcome and the spring extends as the diaphragm pushes the valve member 49 into the closed position with the venting seat, effecting pressurization of the actuator line 26 and of the actuator 18 to thereby move the normally-open damper 17 toward closure. The movement toward closure may be partial, depending upon the magnitude of the pressure differential as compared to the spring force.

As indicated in the figures, the tension/compression spring 56 is connected to a spring holder 57 of a reset arm 58 which is positioned generally above the diaphragm assembly as viewed in the drawings. The reset arm 58 is connected to the main housing 45 and extends from the end including the spring holder 57 back to an opposite end projection 59 which is engaged with the reset unit 46. When the thermostat 28 sends a signal indicating that reset should occur, the reset movement originated in the reset unit 46 causes the spring pressure of the spring 56 to change, thereby changing the pressure differential threshold at which the position of the valve member 49 will be changed. As outlined above, if the controller is in a direct acting mode (which must be in conjunction with a normally-open damper 17), and the thermostat is a direct acting thermostat in a cooling system, reset will pressurize the reset unit to move a shifter member 61 of the reset unit. The shifter 61 is in engagement with the reset arm end projection 59, as shown in FIG. 7. If the system is in a direct reset mode, which would be the case with a cooling system and a direct acting thermostat, the shifter member 61 will be moved down as viewed in FIG. 2, under the influence of a simple piston or diaphragm assembly generally indicated at 62 in FIG. 2 acting against a reset spring 63, responsive to compressed air delivered via the thermostat. This will raise the spring holder 57 to increase tension in the spring 56.

The reset unit includes a screw adjustment knob 65 for adjusting the force in the reset 63 and thus the start point pressure of reset, without changing the predetermined range of reset (typically, a five pound range). Only one setting need be made to establish reset start and end pressures (as contrasted with the above referred Kreuter device, which required two adjustments).

When the controller is reverse acting, as shown in the sectional view of FIG. 8, the movable valve member 49 is normally closed against the vent seat 51, so that normally there is pressurization of the actuator line 26 and the actuator 18 to work against the damper spring and to open the normally closed damper 17. When the differential pressure threshold is exceeded in the reverse acting mode, the valve member 49 leaves the vent seat 51 and vents main air pressure so that the actuator line is depressurized and the damper spring is allowed to close the normally closed damper. Thus, the acting of the controller 25, whether in direct acting or in reverse acting mode, acts to throttle a flow of air in the duct 11 whenever a flow velocity is exceeded.

The controller 25 is reconfigured from direct acting/direct reset to reverse acting/reverse reset simply by changing the position of the spring holder 57, i.e. by moving it down as viewed in these figures, to change it from a tension spring to a compression spring. This has the effect of changing from direct acting to reverse acting by making the valve member 49 normally closed against the venting seat 51 as just described. It also has the effect of changing to reverse reset, since reset will still move the spring holder 57 upwardly, which now will lessen the force of the spring 56 rather than increasing it. Reset therefore lowers the differential pressure threshold at which the diaphragm 53 will move, and in reverse acting mode it will therefore tend to inhibit pressurization of the actuator line 26 and the damper actuator 18, which will tend to close the damper.

It can be seen that this action is matched to the environment within which the reverse reset is placed, i.e. a heating system with a direct acting thermostat 28 or a cooling system with a reverse acting thermostat. For example, in a cooling system with a reverse acting thermostat, high temperature (which should produce more cooling) will cause the thermostat to admit less pressure to the reset unit 46. Conversely, lower temperatures (when cooling will not be required) will send a pressure signal to the reset unit, effecting the action just described and causing the normally closed damper to close.

In this preferred embodiment of the invention, such downward movement of the shifter member 61 causes the reset arm to raise the spring holder 57 (as viewed in FIG. 2), thereby increasing the tension of the spring 56 in this direct reset mode of the controller 25. Reset occurs in this way because in this preferred embodiment the reset arm is pivoted about a fulcrum 64 which is defined by a slidable fulcrum member 66 on the housing. As shown in the drawings, this slidable fulcrum holder is controlled as to its position by a manually rotatable dial 67 which acts through an attached gear and a rack 68 (See FIG. 9—gear not seen).

The effect of the reset motion as described above is to increase the tension of the spring 56 and therefore to increase the pressure differential level at which a change in the position of the valve member 49 will occur. This will increase the differential pressure threshold required to move the valve member 49 so that a higher pressure differential will be required to inhibit the damper 17 from remaining open. This corresponds to a situation where the direct acting thermostat senses the room is too hot, with a positive difference between the actual room temperature and the thermostat's set point temperature, so it is desired that the air flow damper be opened further, or if it is already opened to the maximum, that it remain open even at relatively high velocity of flow.

In the described direct acting/direct reset mode of operation, the adjustment dial 67 acts as a maximum flow of control, while another dial 69 acts as a minimum flow control. These minimum and maximum controls function generally as disclosed in the above described U.S. Pat. No. 4,077,567. The minimum flow control 69 is a screw threaded device which rotates in the reset arm to raise and lower the position of the spring holder 57. It therefore provides a base level setting for the tension (or compression) in the spring 56 in the direct reset modes of operation. Direct reset implies that the prevailing tension/compression condition in the spring 56 will be increased in reset, while in reverse reset, the prevailing condition is decreased in magnitude.

It can therefore be seen that in the direct reset modes, the adjustment dial 69 sets the minimum pressure differential threshold required to move the diaphragm 53, while the fulcrum adjuster dial 67 sets the maximum pressure differential threshold for the diaphragm. This is because when the fulcrum 64 is moved left or right as viewed in the figures, it changes the total displacement that the spring holder 57 will go through during reset. If the fulcrum is moved left to the maxiumum as viewed in FIG. 2 or 9, it will be directly under the spring holder 57 in this preferred embodiment, and reset will then have no effect. The controller 25 will then act simply as a high limit controller, placing a maximum velocity limitation on flow in the duct 11 but not being responsive to a thermostat.

This is a useful function, and such high limit controllers can be produced using the main housing 45 of the controller 25 but not including the reset unit 46, efficiently manufactured using the same components, molds, etc., but without a slidable fulcrum member and without including the adjustment dial 67.

Figure 4:
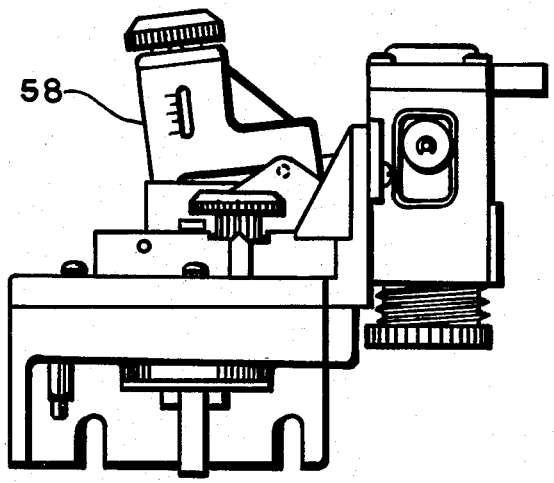

FIG. 4 shows the controller 25 of the invention in a reverse acting/reverse reset configuration. As can be seen from the table above, this mode of operation is applicable to a system wherein the actuator is normally closed (this is necessary when reverse acting) and wherein the system is either a cooling system with a reverse acting thermostat in the room, or is a heating system with a direct acting thermostat in the room. In a normally closed damper system, the damper is seldom entirely closed, to provide a minimum flow of air for ventilation purposes.

When the controller is changed from direct acting to reverse acting or vice versa, the total air and static air tubes 37 and 39 must be interchanged in their connections to the two input ports 38 and 41.

The adjustment of the base or normal position of the spring holder 57 to change the spring 56 from tension to compression (or vice versa) can be achieved in several ways. For example, the limit control knob 69 may have sufficient displacement control (up/down as viewed in the drawings) to move the spring from a tension position to a compression while still allowing for adequate adjustment of the base spring pressure in either event. However, the same effect may be achieved by simply providing a position adjustment for the reset unit 46 with respect to the housing 45. FIG. 4 shows that the reset unit 46 has simply been raised on the housing (as compared to FIG. 2), accomplished by loosening a pair of screws 71, sliding the reset unit 46 upwardly and tightening the screws 71. Slotted holes are provided for this purpose.

Since the reset arm 58 is mounted on a pivot or fulcrum 64, this change in position of the reset unit 46 causes the spring holder 57 at the opposite end of the reset arm to move downwardly. The effect is to change the spring 56 to a compression mode. Further, when reset occurs, as discussed above, the reset shifter member 61 of the reset will travel downwardly, moving the spring holder 57 upwardly, but in this case reducing the force of a compression spring.

Figure 3:
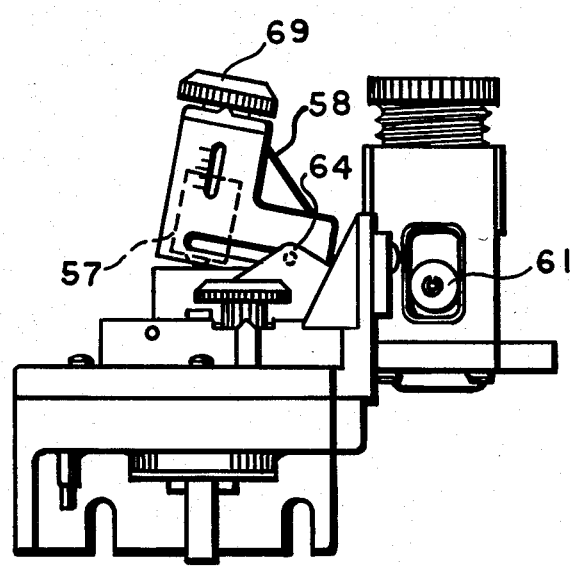
FIGS. 3, 4 and 5 are views of the controller similar to FIG. 2, but showing the reset unit connected to the housing in different positions, corresponding to direct acting/reverse reset, reverse acting/reverse reset, and reverse acting/direct reset modes of operation.

In FIG. 3 the controller 25 of the invention is shown in a direct acting/reverse reset configuration. In this mode of the controller, the reset unit 46 is inverted, thereby reversing the direction of action of the internal reset shifter in response to pressurization from the thermostat, and causing the reset arm 58 to rotate in the opposite direction from what is described above. The reset shifter is raised in reset in response to pressurization, and this has the effect of lowering the spring holder 57 at the other end of the reset arm.

As is apparent from FIG. 3, which shows the controller in a "normal" or non-reset position, the connection of the reset unit 46 on to the housing 45 in the inverted position and at the lower of two possible inverted positions (as determined by the position of mounting with the screws 71 as above), causes the reset arm to be tipped in its base position. As in FIGS. 2 and 4, this changes the base position of the spring holder 57. In this case the spring holder is placed in a position of spring tension. Therefore, the controller is in a direct acting mode. However, the reset is reverse reset, since the upward movement of the reset shifter of the reset unit will lower the spring holder 57, lessening the tension in the spring 56.

Figure 5:
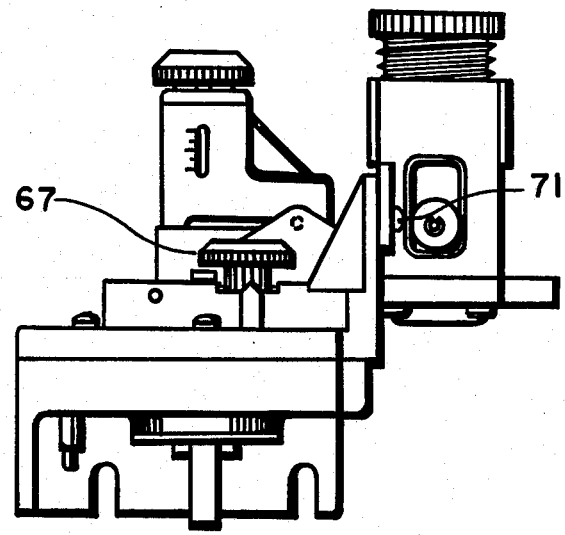
Figure 6:
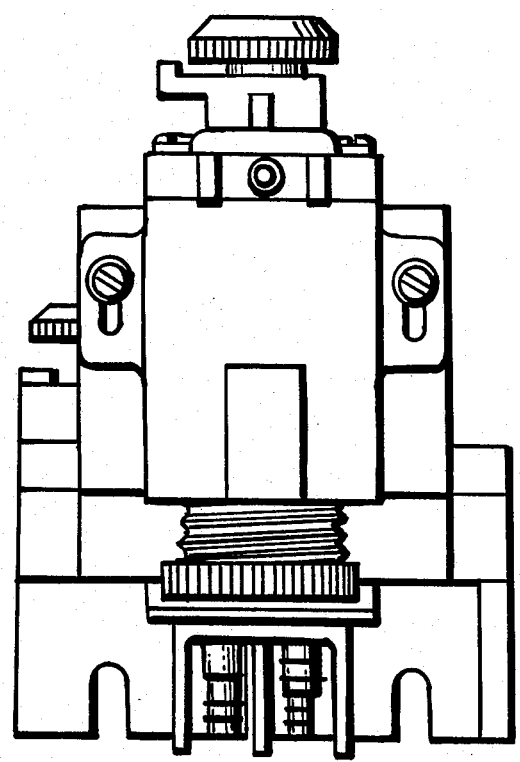
FIG. 6 is an end elevation view of the controller, as viewed from the end at which the reset unit is connected.

FIG. 5 shows the controller 25 again with the reset unit 46 mounted in the inverted position, but with the reset unit at an upper location on the housing. In this configuration the base position of the reset arm 58 is approximately horizontal as shown, and the spring holder is in a position to place the spring in compression, for reverse acting. However, the upward movement of the reset shifter 61 during reset moves the spring holder 57 downwardly to increase the spring force, so that the unit is reverse acting/direct reset.

The use of a movable fulcrum 64 in this preferred embodiment of the invention is an important feature. It enables the motion of the reset shifter 61 to be transferred to an appropriate motion in the spring holder 57, while still allowing the reset unit 46 to be removed from the housing and replaced as described above for four different configurations and modes of operation. The movable fulcrum allows the controller to have a fixed range of motion and force of the reset unit, for varying pressure differential settings. Without the movable fulcrum, the lost adjustment (the dial 67) would have to be provided through the reset unit.

It should be understood that the movable fulcrum 64 need not be located between the reset shifter and the spring holder. It could be positioned at the left end of the reset arm, with the spring holder 57 between the two ends. Although the normal/inverted positions of the reset unit would be changed relative to the functions described above, the action of the controller would remain essentially the same.

The movable fulcrum provides a maximum flow limit adjustment in the manner described above, for direct reset modes of operation. In reverse reset, as shown in FIGS. 3 and 4, the roles of the two adjustment knobs 67 and 69 become reversed. The fulcrum shifting knob 67 becomes a minimum flow adjustment, since by adjusting the position of a lever fulcrum it varies the extent to which spring pressure will be lightened during reset. This has the effect of defining a minimum pressure differential threshold, since the threshold will be lessened during reset rather than raised. The control knob 69, on the other hand, sets the base level of pressure differential thresholds which always prevails in the absence of reset. Since, in the reverse reset mode, the pressure differential set by this control knob 69 is the highest possible pressure differential threshold in this mode of operation, it becomes the maximum control limit adjustment.

Another feature of the controller 25 which help maintain an accurate pressure differential threshold regardless of static pressure changes in the duct 11 is shown in FIG. 7. The venting valve seat 51 is not permanently fixed in position but is adjustable up/down as viewed in the drawings. Due to manufacturing tolerances a fixed seat would not in every case be correctly positioned to maintain an accurate pressure differential threshold when static pressure in the duct varies.

The adjustable venting valve seat 51 is adjustable from the outside of the closed assembly, by insertion of a tool (not shown) through a passageway 27 which also serves as the venting port as described above. The tool is engageable with teeth 80 on a circular disk member 81 to rotate the member 81. This member is threaded and surrounds and is in threaded engagement with the venting seat 51, as illustrated. Rotation of the circular member 81 with the tool therefore raises or lowers the seat 51.

The adjustment to fine tune the seat 51 position can be made with the controller connected to test air, at the place of manufacture.

A similar adjustment was included in a prior controller corresponding generally to the above referenced U.S. Pat. No. 4,077,567. However, the adjustment feature has far greater advantage in the context of the present invention, because when the controller 25 is in a reverse acting mode it will require a different setting from that which is optimum for a direct acting mode. Thus, the adjustment when used in the present invention provides two important functions: calibration to compensate for manufacturing tolerances, and calibration for the different modes of direct acting and reverse acting.

While I have illustrated and described the preferred embodiments of our invention, it is to be understood that these are capable of variation and modification, and I therefore do not wish to be limited to the precise details set forth, but desire to avail myself of such changes and alterations as fall within the purview of the following claims.

I claim:

1. A pneumatic controller for use in controlling air flow in a distribution system for supplying conditioned air to a room, comprising, a housing with input ports for total air, static air, and main air supply, for connection to conduits leading to a velocity probe and a static air monitor in a duct of the system, and to a supply of compressed air, and with an actuator output port for connection to a conduit leading to an actuator or motor operating an air flow damper in the duct, for control of the actuator by the controller, differential pressure responsive valve means in the housing for receiving total air and static air inputs and for adjusting a flow of compressed air between the main air supply input port and the actuator output port in response to the magnitude of a pressure differential between the total air and the static air, said valve means comprising a single differential pressure responsive valve member for all modes of operation of the controller, and including spring means biasing the valve means against the influence of the pressure differential, a reset unit connected to the housing with a reset input port for connection to a conduit leading to a thermostat in the room, of the type which adjusts a flow of compressed supply air in response to changes in temperature in the room relative to a set point temperature on the thermostat, the reset unit including air pressure responsive shifting means for controlling the position of a spring-biased movable shifter in response to input of compressed air at the reset input port, reset means for adjusting the pressure of the spring means to thereby adjust the level of pressure differential required to move the differential pressure responsive valve means against the spring means, in response to movement of said shifter in the reset unit, and system variation accommodation means for enabling reconfiguration of the controller as a direct acting/direct reset controller, a reverse acting/reverse reset controller, a direct acting/reverse reset controller or a reverse acting/direct reset controller, to accommodate different types of actuation and thermostats in different systems utilizing a single differential pressure responsive valve means.

2. The controller of claim 1, wherein the system variation accommodation means includes spring tension/compression reversing means for changing said spring means between functioning as a tension spring and as a compression spring, so that for a given movement of the reset shifter the spring reversing means varies the effect of reset, between increasing and decreasing the pressure of the spring means and therefore between increasing and decreasing said level of pressure differential required, to thereby enable change between direct reset and reverse reset.

3. The controller of claim 2, wherein the spring means comprises a coil spring, and wherein the spring reversing means comprises a spring holder at one end of the coil spring and means for changing the position of the spring holder to vary the extension of the spring, and including spring orientation means associated with the coil spring for preventing buckling of the spring when in compression.

4. The controller of claim 3, wherein said means for changing the position of the spring holder is manual.

5. The controller of claim 1, wherein the valve means includes a valve port which may be normally open or normally closed depending on the direction of biasing of said spring means, and wherein the system variation accommodation means includes spring reversing means for changing said spring means between functioning as a tension spring and as a compression spring, so that for a given movement of the reset shifter the spring reversing means varies the effect of reset, between increasing and decreasing the pressure of the spring means and therefore between increasing and decreasng said level of pressure differential required, to thereby enable change between direct acting/direct reset and reverse acting/reverse reset and between direct acting/reverse reset and reverse acting/direct reset.

6. The controller of claim 5, further including reset shifter reversal means, for enabling reversal of the direction in which said movable shifter moves in response to compressed air input, so that the controller may be changed between direct acting/direct reset and direct acting/reverse reset and between reverse acting/direct reset and reverse acting reverse reset.

7. The controller of claim 6, wherein the reset shifter reversal means includes means for connection of the reset unit to the housing in either of a normal and an inverted position.

8. The controller of claim 7, wherein the reset means includes a reset arm operably connected to the spring means to adjust the level of pressure differential required, in response to movement of said shifter, and means associated with the shifter for receiving one end of the reset arm in either of the normal and the inverted position.

9. The controller of claim 8, further including arm pivot means associated with the reset arm and the housing, for causing the reset arm to pivot about a fulcrum in response to movement of said shifter, the spring means being connected to an end of the reset arm opposite said one end, so that adjustment of the spring means occurs in a direction opposite the direction of movement of the shifter.

10. The controller of claim 9, wherein the arm pivot means includes slidable adjustment means for manually adjusting the position of the fulcrum, closer to or farther from said opposite end of the reset arm, whereby the magnitude of adjustment of the spring means by the reset unit and reset means may be manually adjusted by changing the position of the fulcrum point, closer positions of the fulcrum to said opposite end of the reset arm effecting lesser magnitude of reset adjustment of the spring means.

11. The controller of claim 10, further including manual spring adjustment means for adjusting the pressure of the spring means to thereby adjust the level of pressure differential required to move the differential pressure responsive valve means in absence of reset.

12. The controller of claim 11, wherein the manual spring adjustment means comprises a spring holder connected to said opposite end of the reset arm, engaged with the spring meanns, and manually rotatable threaded means for changing the position of the spring holder.

13. The controller of claim 1, wherein the valve means includes a venting valve seat positioned for engagement by said differential pressure responsive valve member to cause pressurized air to flow to the actuator output port when the movable valve member is against the venting valve seat and to inhibit such pressurized air flow when the movable valve member is removed from the seat, and including valve seat adjusting means for adjusting the position of the venting valve seat externally to the controller.

14. The controller of claim 13, wherein the valve seat adjusting means comprises a circular rotatable member in the housing, being in threaded engagement with the venting valve seat such that rotation of the rotatable member adjusts axially the position of the valve seat, and including an opening in the housing for receipt of a tool for engagement with and rotation of the rotatable member.

15. The controller of claim 1, wherein the reset unit includes setting means for setting a reset start position without affecting reset range.

16. The controller of claim 15, wherein the setting means comprises a spring engaged with the movable shifter for opposing the influence of the compressed air, and screw-threaded means for adjusting force in the spring, whereby the reset pressure range remains the same regardless of spring force adjustment, due to an inherently constant spring rate of the spring.

17. In a pneumatic controller for controlling a flow of air in a duct of a conditioned air distribution system, the controller being of the type having a differential pressure responsive valve means mounted in a housing for receiving total air and static air inputs and for adjusting a flow of air between a main air supply and a damper actuator output line in response to the magnitude of a pressure differential between the total air and the static air, and having a reset device responsive to a pressurized air signal from a thermostat, the improvement comprising:

a velocity spring biasing the valve means against the influence of differential pressure from total air and static air, a reset arm having one end engaged with the reset device for movement therewith during reset, a spring holder spaced from said one end of the reset arm and connected to the velocity spring to control the extension and thus the force of the spring so as to control a pressure differential threshold of the valve means, fulcrum means for mounting the reset arm on the housing pivotally such that motion of the reset device on said one end of the reset arm causes a different motion of the spring holder, and fulcrum adjustment means for moving the position of the fulcrum closer to or farther away from said one end of the reset arm to thereby adjust the displacement of the spring and the consequent pressure differential threshold of the valve means occurring during reset.

18. The improvement defined in claim 17, further including manual spring adjustment means for adjusting the pressure of the velocity spring to thereby adjust the pressure differential threshold existing in the absence of reset.

* * * * *